R. REIN.
CARRYING MECHANISM.
APPLICATION FILED MAY 25, 1908.

936,942.

Patented Oct. 12, 1909.
3 SHEETS—SHEET 1.

Witnesses:
C. H. Crawford
L. Lang

Inventor:
Robert Rein
by B. Singer
Attorney

R. REIN.
CARRYING MECHANISM.
APPLICATION FILED MAY 25, 1908.

936,942.

Patented Oct. 12, 1909.
3 SHEETS—SHEET 2.

Witnesses:
C. H. Crawford
L. Lang

Inventor:
Robert Rein
by B. Singer
Attorney

R. REIN.
CARRYING MECHANISM.
APPLICATION FILED MAY 25, 1908.

936,942.

Patented Oct. 12, 1909.
3 SHEETS—SHEET 3.

Witnesses
F. Stern
H C Hunsberger

Inventor
Robert Rein
by B. Singer
Attorney

UNITED STATES PATENT OFFICE.

ROBERT REIN, OF BERLIN, GERMANY.

CARRYING MECHANISM.

936,942.  Specification of Letters Patent.  Patented Oct. 12, 1909.

Application filed May 25, 1908. Serial No. 434,928.

*To all whom it may concern:*

Be it known that I, ROBERT REIN, a subject of the Emperor of Germany, and residing at 19 Puttkamerstrasse, Berlin, Germany, have invented certain new and useful Improvements in Carrying Mechanism for Advancing the Tens-Wheel in Calculating-Machines of the Thomas Type, of which the following is a specification.

This invention relates to improvements in carrying mechanism.

Objects of the invention are to provide means whereby a damaging or breaking of certain machine parts is prevented, and to provide a more simple connection between certain operating parts of calculating machines of the Thomas type.

Figure 1:
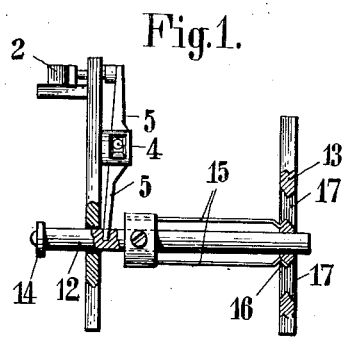
Figure 2:
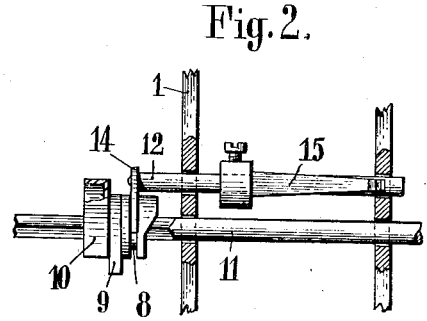
Figure 3:
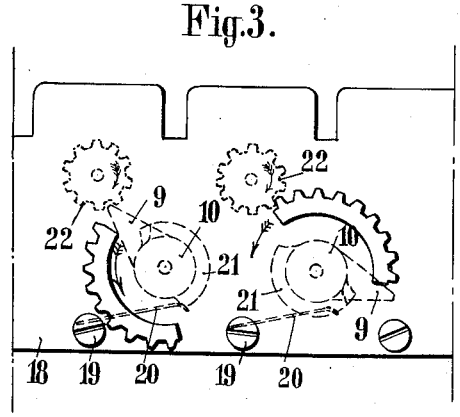
Figure 4:
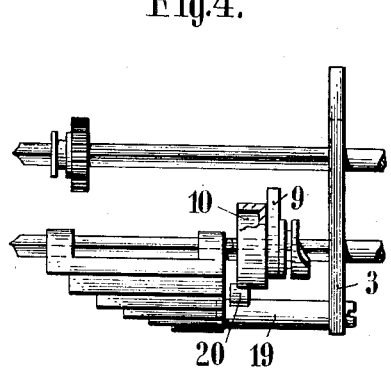
Figure 5:
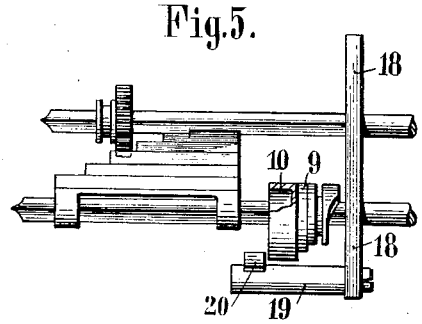
Figure 6:
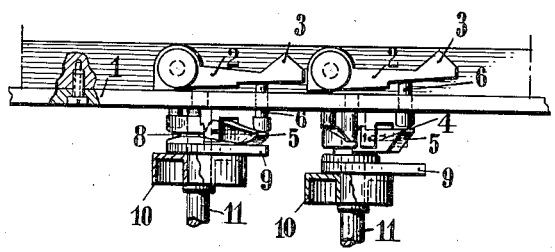
Figure 7:
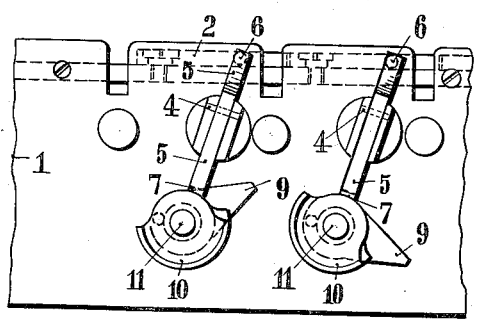
Figures 8, 9:
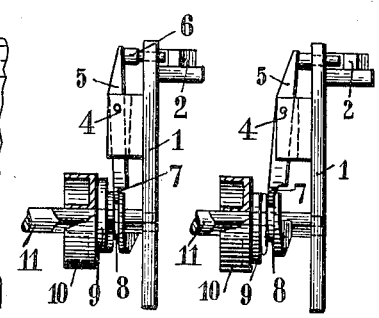
Figure 10:
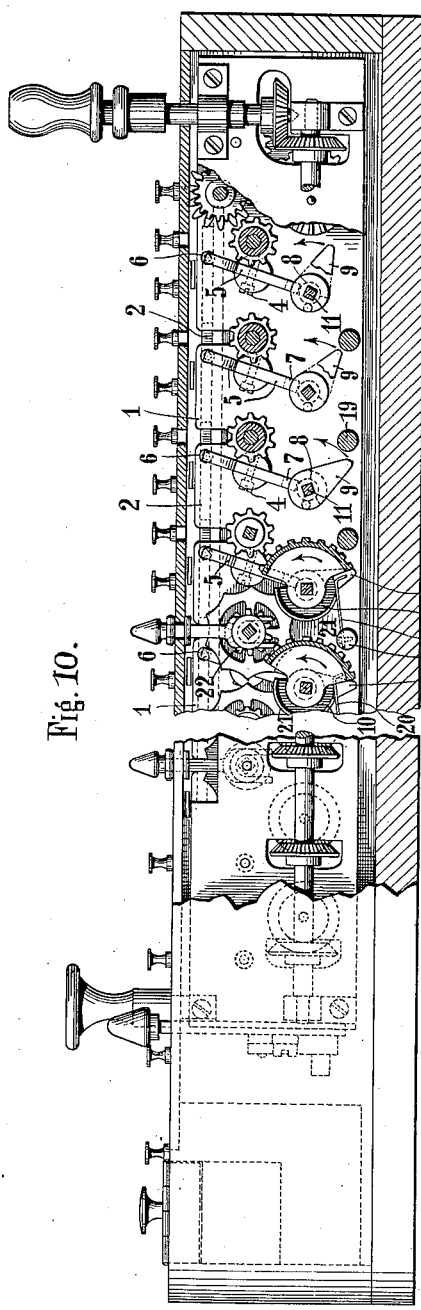
Figure 11:
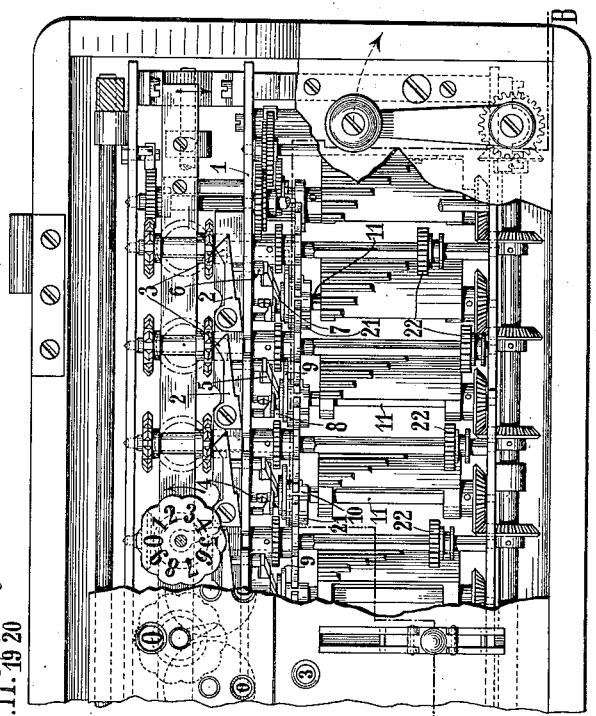
Figure 11:
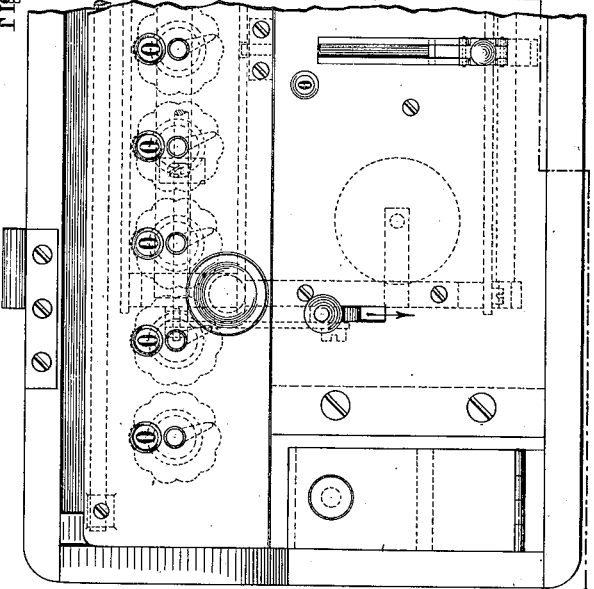
Figure 12:
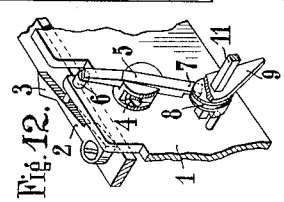
Figure 13:
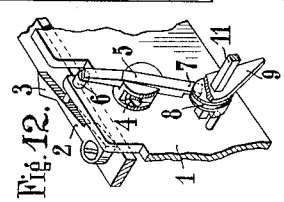

In the drawings, Figure 1 is a side elevation partly in section of a certain mechanism in the known calculating machine of the Thomas type. Fig. 2 is a plan view of the same. Fig. 3 is a front elevation of a part of the improved mechanism. Fig. 4 is a plan top view of the same when in inoperative position. Fig. 5 is a plan top view of the same showing it in operative position. Fig. 6 is a plan top view of another part of the mechanism, showing it in two positions. Fig. 7 is a front elevation of the same. Figs. 8 and 9 are side elevations of the same in two different operating positions. Fig. 10 is a front elevation of a calculating machine with a wall partly taken away, partly in section. Fig. 11 is a plan top view of a calculating machine, the top plates being partly removed. Figs. 12 and 13 are perspective views of parts of the improved mechanism, similar to Fig. 9 and Fig. 8 respectively.

In the calculating machine of the Thomas type the tens wheel is advanced by means of a cam finger, which is slidably arranged on the shaft of the counting drums. Figs. 1 and 2 serve to illustrate the known mechanism used for imparting sliding motion to said cam finger on its shaft. A pawl 2 engages an end of lever 5, said lever being pivoted on pin 4, supported on the wall of the machine frame. The lower arm of lever 5 projects into a slot of the bar 12, which is slidably mounted in the walls 1 and 13 of the frame. At its forward end, projecting through wall 1, the bar 12 carries a fork 14 which is guided in groove 8 of the advancing cam finger 9. 10 designates a locking cylinder rigidly connected to said advancing cam. Locking springs 15 serve for securing the parts in their end position. The V-shaped free ends 16 of these springs register with apertures 17 in the wall 13, said apertures being provided with correspondingly shaped edges.

In the operation of the machine a quick rotation of the operating handle will cause a sudden impact of the described parts and under circumstances an incomplete action of the bars 12 and the cams 9, thereby failing to advance the tens wheel.

In the present invention means are provided which hold the cam in operative position as soon as it entered therein and which prevent an incomplete action by holding it in that position until the tens wheel is actuated. Simultaneously the number of parts which serve for advancing the tens wheel is reduced and increased simplicity of the mechanism is obtained.

The tens wheel 22 in Fig. 3 is actuated by the finger 9. As may be seen from Fig. 4 the finger 9 is attached to a cam sitting on the same shaft and to a short incomplete cylinder 10. The cylinder 10 is adapted to lock the tens wheel by engagement with a ratchet disk, as may be seen from Figs. 10 and 11. A spring 20 is mounted to wall 3 by means of a pin 19, one of said springs being provided for every locking cylinder. The spring 20 is arranged with respect to the locking cylinder, so that its forward end slides on the cylindrical surface 21 thereof, as long as the cylinder is in inoperative position as shown in Fig. 4. As soon as the cylinder is drawn toward the wall 18 (Fig. 5) the forward end of the spring 20 rises and a return of the locking cylinder 10 to inoperative position is prevented until after actuating the tens wheel 22. As soon as cam finger 9 has engaged said tens wheel and has driven it one step, the spring 22 is opposite the incomplete portion of the locking cylinder and the entire aggregation of parts, i. e. finger 9, cam, and locking cylinder 10 may be pushed back in inoperative position.

In Figs. 6 to 9 is shown the mechanism which imparts reciprocating motion to the cam finger and locking cylinder on their shaft 11. The number of parts therein is materially reduced with respect to the mechanism illustrated in Figs. 1 and 2, the bar 12, spring 16 and engaging fork 14 being omitted.

The pawls 2 are pivoted on the wall 1 adjacent the counting dials and are provided with projecting portions 3, which may be actuated by suitable lugs on the counting dials. The levers 5, which directly shift the cam on its shaft 11, are pivoted in pins 4 on the opposite side of the wall 1. They are on their upper end actuated by laterally projecting pin 6, extending through a suitable aperture in the wall and being engaged by the pawl 2. The lower end of the levers 5 is flattened into a nose like portion 7, which projects into groove 8 of the cam and by oscillating the lever about its pivot 4 a reciprocating motion of said cam on its shaft 11 may be obtained.

I claim:

1. A mechanism for advancing the tens-wheel in calculating machines comprising in combination, a rotatable shaft, a cam slidably mounted thereon, a tens wheel, a finger connected with said cam and adapted to actuate said tens wheel, means for imparting a sliding motion in one direction to said cam on said shaft and means for preventing a return motion of said cam on said shaft before said finger has actuated said tens wheel.

2. A mechanism for advancing a tens wheel in calculating machines comprising in combination a rotatable shaft, a cam slidably mounted thereon, a tens wheel, a finger connected with said cam and adapted to actuate said tens wheel, a locking cylinder connected with said cam, means for imparting sliding motion to said cam on said shaft, and a spring adapted to engage the cylindrical surface of said locking cylinder when said finger is in inoperative position and adapted to prevent return sliding motion of said cam by obtruding against the face of said locking cylinder.

3. A mechanism for advancing the tens wheel in calculating machines comprising in combination a rotatable shaft, a cam slidably mounted thereon and provided with an annular groove, a tens wheel, a finger adapted to actuate said tens wheel and connected with said cam, a lever extending with one end into said annular groove and adapted to impart sliding motion to said cam on said shaft, means for oscillating said lever and means for preventing return sliding motion of said cam, before said finger actuated the tens wheel.

4. A mechanism for advancing the tens wheel in calculating machines comprising in combination a rotatable shaft, a cam slidably mounted thereon and provided with an annular groove, a tens wheel, a finger adapted to actuate said tens wheel and connected with said cam, a lever extending with one end into said annular groove and adapted to impart sliding motion to said cam on said shaft, a pawl, a pin in coaction with said pawl and said lever, and means for preventing incomplete action of said finger upon said tens wheel.

In testimony whereof I affix my signature in presence of two witnesses.

ROBERT REIN.

Witnesses:
HENRY HASPER,
WOLDEMAR HAUPT.